(12) United States Patent
Sasaki et al.

(10) Patent No.: US 8,233,129 B2
(45) Date of Patent: Jul. 31, 2012

(54) METHOD OF MANUFACTURING LIQUID CRYSTAL DISPLAY DEVICE INCLUDING FORMING BEVELED SIDES OF SUBSTRATES FORMING LIQUID CRYSTAL PANEL

(75) Inventors: Susumu Sasaki, Chiba (JP); Hiroaki Endo, Mobara (JP); Sota Nemoto, Mobara (JP); Masanori Yuuki, Oamishirasato (JP); Hitoshi Azuma, Yokohama (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 329 days.

(21) Appl. No.: 12/372,961

(22) Filed: Feb. 18, 2009

(65) Prior Publication Data
US 2009/0213319 A1 Aug. 27, 2009

(30) Foreign Application Priority Data
Feb. 26, 2008 (JP) ................................. 2008-044664

(51) Int. Cl.
*G02F 1/1339* (2006.01)
*G02F 1/1341* (2006.01)
(52) U.S. Cl. ......... 349/154; 349/153; 349/189; 349/190

(58) Field of Classification Search .................. 349/153, 349/189, 154, 190
See application file for complete search history.

(56) References Cited

U.S. PATENT DOCUMENTS
6,778,249 B1 * 8/2004 Kamosawa et al. ........... 349/153
2004/0141141 A1 * 7/2004 Ota et al. ....................... 349/153

FOREIGN PATENT DOCUMENTS
JP 2003-040649 2/2003
* cited by examiner

*Primary Examiner* — Lauren Nguyen
(74) *Attorney, Agent, or Firm* — Antonelli, Terry, Stout & Kraus, LLP.

(57) ABSTRACT

Provided is a method of manufacturing a liquid crystal display device containing a liquid crystal panel which holds a liquid crystal between first and second glass substrates. The method includes: an injecting step of injecting the liquid crystal from an injection hole for injecting the liquid crystal, which is provided on at least one side of the liquid crystal panel; a sealing step of sealing the injection hole with a sealing material; a beveling step of processing sides of the first glass substrate and the second glass substrate, at which the injection hole is provided, into a shape in which a thickness of each of the sides increases from end portions of the first glass substrate and the second glass substrate toward central portions thereof; and an etching step of etching the first glass substrate and the second glass substrate by chemical polishing.

10 Claims, 6 Drawing Sheets

PRIOR ART

FIG.8

PRIOR ART

METHOD OF MANUFACTURING LIQUID CRYSTAL DISPLAY DEVICE INCLUDING FORMING BEVELED SIDES OF SUBSTRATES FORMING LIQUID CRYSTAL PANEL

CROSS-REFERENCE TO RELATED APPLICATION

The present application claims priority from Japanese application JP2008-044664 filed on Feb. 26, 2008, the content of which is hereby incorporated by reference into this application.

BACKGROUND OF THE INVENTION

1. Field of the Invention

The present invention relates to a method of manufacturing a liquid crystal display device, and more particularly, to a method of manufacturing a liquid crystal display device used as a flexible display in which a glass substrate is thinned and a display surface can be bent.

2. Description of the Related Art

A liquid crystal display panel contained in a liquid crystal display device is an image display device which fundamentally includes a liquid crystal layer injected between a first substrate and a second substrate, each being suitably a glass substrate, and which is based on the fact that the alignment direction of a liquid crystal is changed according to an electric field applied to the liquid crystal from a pixel selection electrode of one of the first substrate and the second substrate. At present, the development of a liquid crystal display device used as a flexible display in which the glass substrate of the liquid crystal display panel is thinned and a display surface can be bent has been advanced.

An example of a method of thinning the glass substrate includes a method of chemically polishing the glass substrate by an etching solution such as hydrofluoric acid. A conventional technology of the method of chemically polishing the glass substrate is disclosed in JP 2003-40649 A.

When the glass substrate is thinned and then a liquid crystal injection hole provided in a side surface of the glass substrate is sealed with a sealing material made of a resin, it is likely to cause a defect in which the sealing material leaks out of the upper and lower surfaces of the glass substrate because the glass substrate is thin. Therefore, the method of chemically polishing the glass substrate after the liquid crystal injecting process and the liquid crystal sealing process is efficient in terms of mass production.

However, the sealing material made of the resin is not dissolved by hydrofluoric acid. Therefore, during an etching process, the convection of the etching solution is inhibited, and hence an etching rate of the glass substrate becomes lower at a portion close to the sealing material, with the result that a thick portion of the glass substrate is locally produced at the portion close to the sealing material.

A local thickness difference of the glass substrate causes the breaking of glass or the remaining of bubbles during subsequent polarizing plate bonding, thereby degrading image quality.

SUMMARY OF THE INVENTION

The present invention has been made to solve the problems of the conventional technology. An object of the present invention is to provide a method of manufacturing a liquid crystal display device in which a glass substrate is uniformly thinned by chemical polishing, breaking of glass or remaining of bubbles during subsequent polarizing plate bonding is prevented, an excellent yield and a high performance are obtained, and a display surface can be bent.

A typical aspect of the present invention disclosed in this application is outlined briefly as follows.

(1) A method of manufacturing a liquid crystal display device including a liquid crystal panel which has a first glass substrate, a second glass substrate, and a liquid crystal held in a predetermined gap with which the first glass substrate and the second glass substrate are bonded to each other by a seal material, includes: an injecting step of injecting the liquid crystal from an injection hole for injecting the liquid crystal, which is provided on at least one side of the liquid crystal panel; a sealing step of sealing the injection hole with a sealing material; a beveling step of processing sides of the first glass substrate and the second glass substrate, at which the injection hole is provided, into a shape in which a thickness of each of the sides increases from end portions of the first glass substrate and the second glass substrate toward central portions thereof; and an etching step of etching the first glass substrate and the second glass substrate by chemical polishing.

(2) In the method according to Item (1), a width of the sealing material in a thickness direction of the liquid crystal panel is equal to or smaller than a thickness of the liquid crystal panel after the etching step.

(3) In the method according to Item (1) or (2), the liquid crystal panel includes a terminal portion in which a terminal for receiving an external signal is provided outside the seal material and on a surface of the first glass substrate, which is opposed to the liquid crystal, and the etching step includes forming a seal material outside the terminal portion for protecting the terminal portion.

(4) In the method according to Item (1) or (2), the liquid crystal panel includes a terminal portion in which a terminal for receiving an external signal is provided outside the seal material and on a surface of the first glass substrate, which is opposed to the liquid crystal, and the etching step includes forming a protective film having an etching resistance on the terminal portion.

(5) In the method according to Item (1) or (2), the liquid crystal panel includes a terminal portion in which a terminal for receiving an external signal is provided outside the seal material and on a surface of the first glass substrate, which is opposed to the liquid crystal, the terminal portion is connected to a flexible circuit board, and the etching step includes forming a protective film having an etching resistance on surfaces of the terminal portion and the flexible circuit board.

(6) In the method according to Items (1) to (5), the first glass substrate and the second glass substrate after the etching step have thicknesses of 0.2 mm or smaller.

An effect obtained by the typical aspect of the present invention disclosed in this application is briefly described as follows.

The glass substrate can be uniformly thinned by chemical polishing. Therefore, it is possible to manufacture a liquid crystal display device in which the breaking of glass or the remaining of bubbles during subsequent polarizing plate bonding is prevented, an excellent yield and a high performance are obtained, and a display surface can be bent.

DETAILED DESCRIPTION OF THE INVENTION

Hereinafter, a best mode of the present invention is described in detail by means of embodiments with reference to the attached drawings.

[Embodiment 1]

Figure 1:
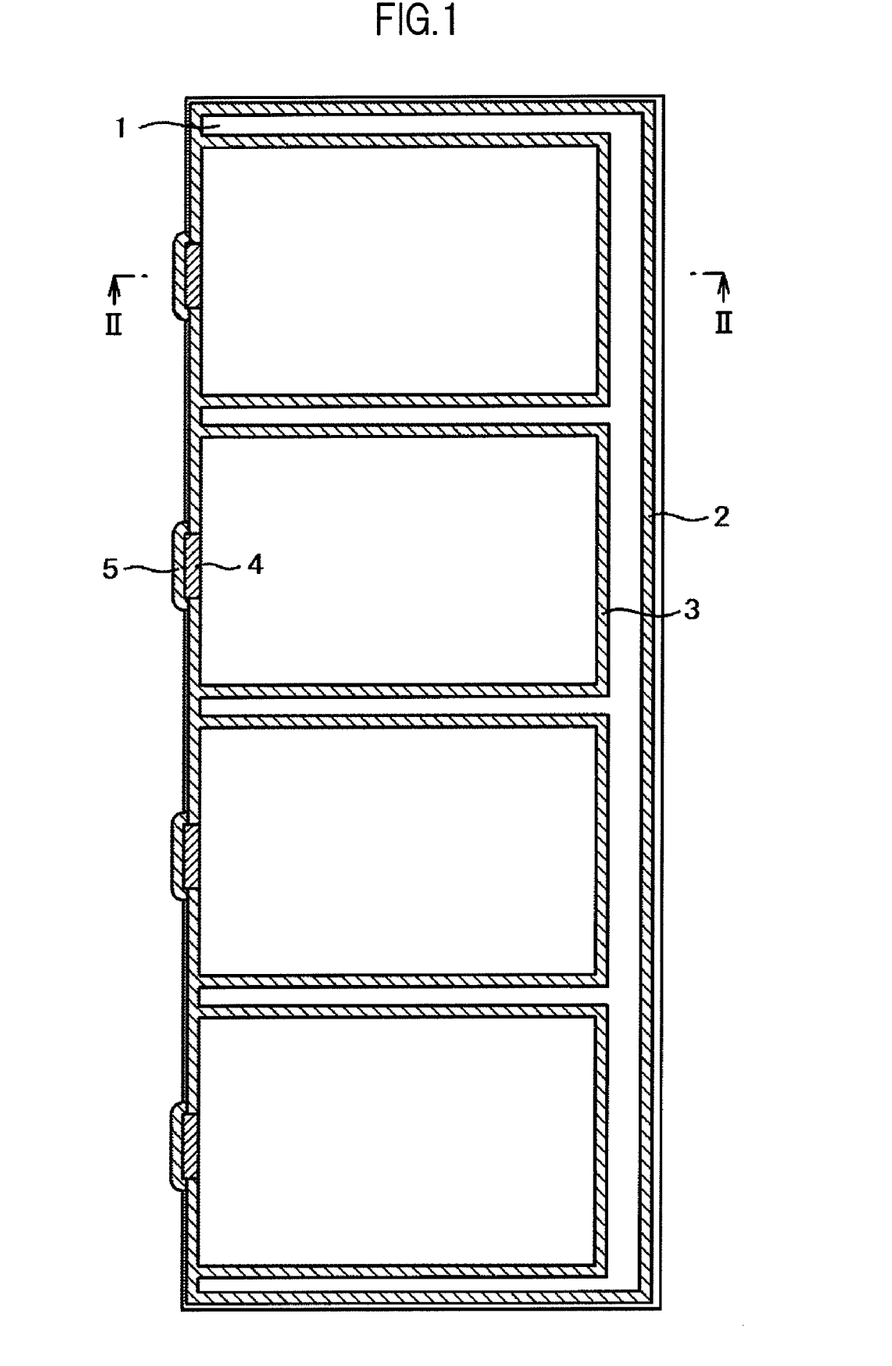
FIG. 1 is an explanatory structural view illustrating a pair of mother glass substrates in which a plurality of liquid crystal panels are formed according to Embodiment 1 of the present invention.

FIG. 1 illustrates a pair of mother glass substrates in which a plurality of liquid crystal panels are formed. In FIG. 1, 4×1 liquid crystal panels are formed between the pair of mother glass substrates in a strip shape.

FIG. 1 illustrates a pair of mother glass substrates 1 in which the plurality of liquid crystal panels are formed, a peripheral seal material 2, seal materials surrounding liquid crystals 3, injection holes 4, and sealing materials 5.

Each of the plurality of liquid crystal panels is formed as follows. The pair of mother glass substrates 1 are bonded to each other with a predetermined gap. A liquid crystal is injected from the injection hole 4 to the predetermined gap surrounded by the seal material 3. The injection hole 4 is sealed with the sealing material 5 made of a resin.

Figure 2:
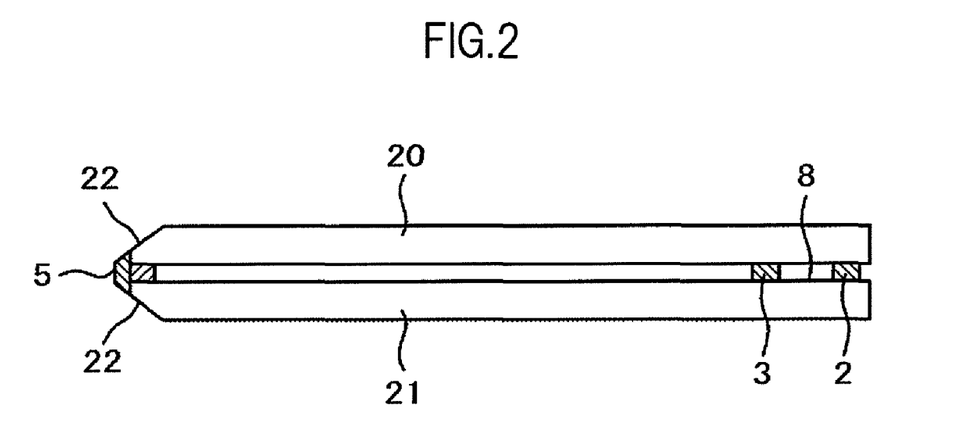
FIG. 2 is a cross sectional view taken along a line A-A of FIG. 1 before chemical polishing.

FIG. 2 is a cross sectional view taken along a line A-A of FIG. 1 before chemical polishing. FIG. 2 illustrates a first glass substrate 21 and a second glass substrate 20. FIG. 2 also illustrates a terminal portion 8 and beveling portions 22.

The first glass substrate 21 and the second glass substrate 20 serve as a pair of glass substrates. The first glass substrate 21 is also referred to as a TFT substrate because TFTs are formed thereon. The second glass substrate 20 is also referred to as a color filter substrate because a color filter is formed thereon.

The terminal portion 8 is a region in which terminals for receiving external signals for driving the TFTs formed on the first glass substrate 21 are provided. The peripheral seal material 2 is formed to prevent the terminal portion 8 from being brought into contact with an etching solution during chemical polishing.

In a side of the first glass substrate 21 and a side of the second glass substrate 20 on which the sealing material 5 is formed, a glass substrate end portion is beveled to form the beveling portions 22.

When the beveling portions 22 are formed, a thickness of the sealing material 5 in a glass substrate thickness direction is smaller than each thickness of portions other than the beveling portions 22, of the first glass substrate 21 and the second glass substrate 20. The thickness of the sealing material 5 is set to a value smaller than a thickness of a liquid crystal panel obtained after the first glass substrate 21 and the second glass substrate 20 are etched by chemical polishing.

Figure 3:
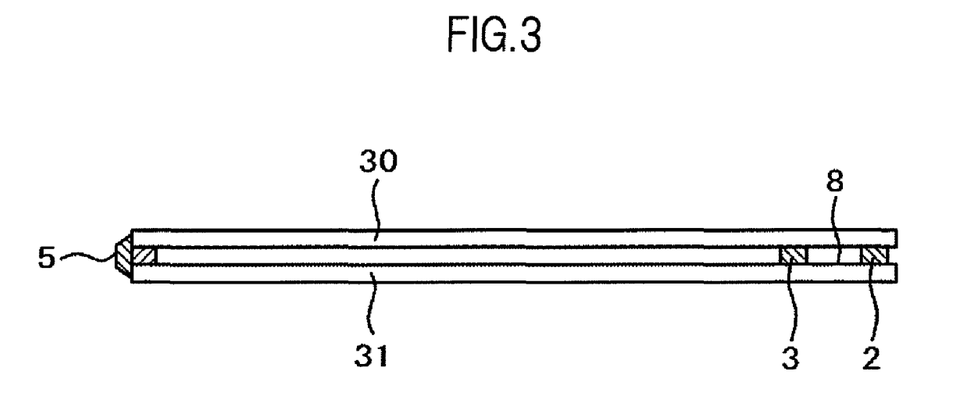
FIG. 3 is a cross sectional view taken along the line A-A of FIG. 1 after chemical polishing.

FIG. 3 is a cross sectional view taken along the line A-A of FIG. 1 after chemical polishing. FIG. 3 illustrates a first glass substrate 31 after chemical polishing and a second glass substrate 30 after chemical polishing.

In a chemical polishing method, hydrofluoric acid is used as the etching solution. The liquid crystal panels are formed in the strip shape as illustrated in FIG. 1. The pair of mother glass substrates are immersed in the etching solution to thin the glass substrates to a predetermined thickness. A thickness of each of the first glass substrate 31 and the second glass substrate 30 after chemical polishing is equal to or smaller than 0.2 mm. When the flexibility of a liquid crystal display device whose display surface can be bent is taken into account, the thickness of the glass substrates is desirably approximately 0.05 mm.

The sealing material 5 is formed in advance such that the thickness thereof becomes smaller than the thickness of the liquid crystal panel after chemical polishing. Therefore, the first glass substrate 31 and the second glass substrate 30 after chemical polishing can be etched such that both the portions thereof close to the sealing material 5 and the other portions thereof are uniform in thickness.

Figure 7:
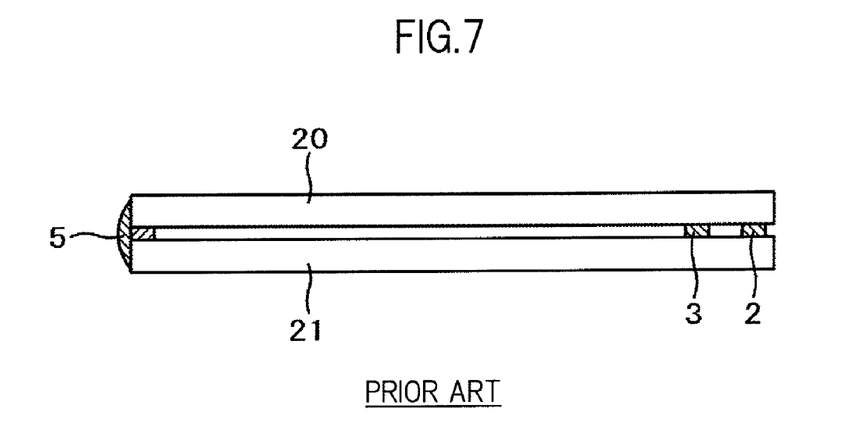
FIG. 7 is a cross sectional view illustrating a pair of mother glass substrates before chemical polishing in a conventional structure.
Figure 8:
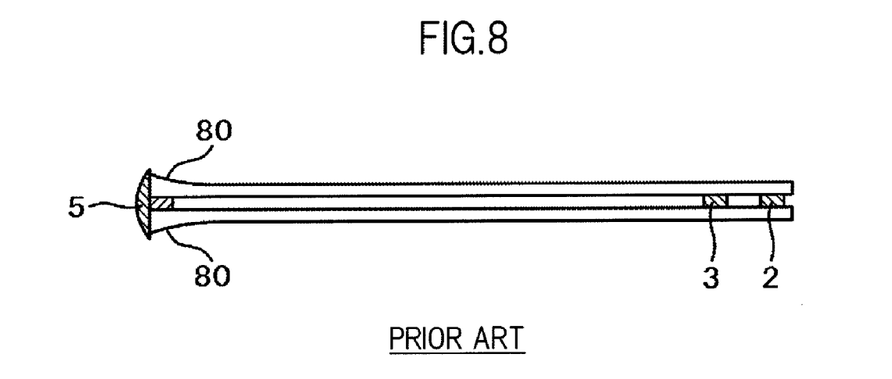
FIG. 8 is across sectional view illustrating the pair of mother glass substrates after chemical polishing in the conventional structure.

FIG. 7 is a cross sectional view illustrating a state before chemical polishing in a conventional case where the beveling as illustrated in FIG. 2 is not performed. FIG. 8 is a cross sectional view illustrating a state after chemical polishing is performed in the state of FIG. 7 in which the beveling is not performed.

When the beveling is not performed, the thickness of the sealing material 5 is substantially equal to the thickness of the liquid crystal panel before chemical polishing. The sealing material made of the resin is not dissolved by hydrofluoric acid used as the etching solution. Therefore, during the etching process, the convection of the etching solution is inhibited, and hence an etching rate of portions of the glass substrates, which is close to the sealing material, becomes lower, with the result that thick portions of the glass substrates are locally produced close to the sealing material as indicated by reference numeral 80 in FIG. 8.

Figure 4A:
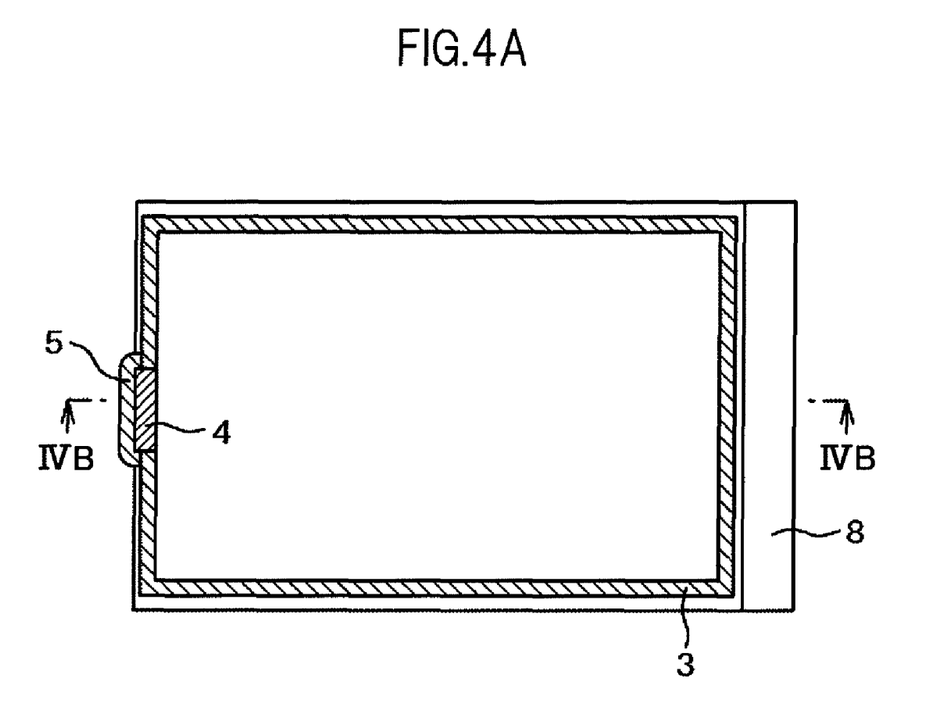
FIGS. 4A and 4B illustrate one of the liquid crystal panels obtained by cutting the glass substrates after chemical polishing.
Figure 4B:
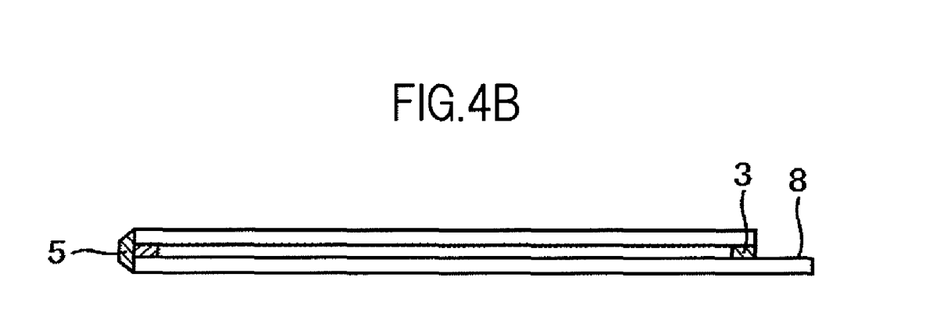

FIGS. 4A and 4B illustrate one of the liquid crystal panels obtained by cutting the glass substrates after chemical polishing. FIG. 4A is a plan view and FIG. 4B is a cross sectional view taken along a line B-B of FIG. 4A.

As illustrated in FIG. 4B, the terminal portion 8 is exposed. As described above, during the etching process, the terminal portion 8 is not in contact with the etching solution because of the presence of the peripheral seal material 2. Therefore, the terminals formed in the terminal portion 8 are not dissolved by the etching solution.

After each of the liquid crystal panels is obtained by cutting as illustrated in FIGS. 4A and 4B, though not illustrated, polarizing plates are bonded to the surface of the first glass substrate and the surface of the second glass substrate. For signal input to the terminal portion 8, a flexible circuit board is connected therewith. If necessary, electronic parts may be directly connected onto a surface of the terminal portion 8.

In this embodiment, the glass substrates can be etched so as to be uniform in thickness. Therefore, when the polarizing plates are bonded to the glass substrates, the breaking of glass or the remaining of bubbles does not occur. Thus, it is possible to manufacture a liquid crystal display device whose quality is high because of no degradation in image quality which is caused by the breaking of glass or the remaining of bubbles and whose display surface can be bent.

In this embodiment, the case where the plurality of liquid crystal panels are formed in the strip shape is described. However, the same effect is expected even in a case where the etching process is performed for each of the liquid crystal panels, because only the cutting process is not performed.

[Embodiment 2]

Figure 5A:
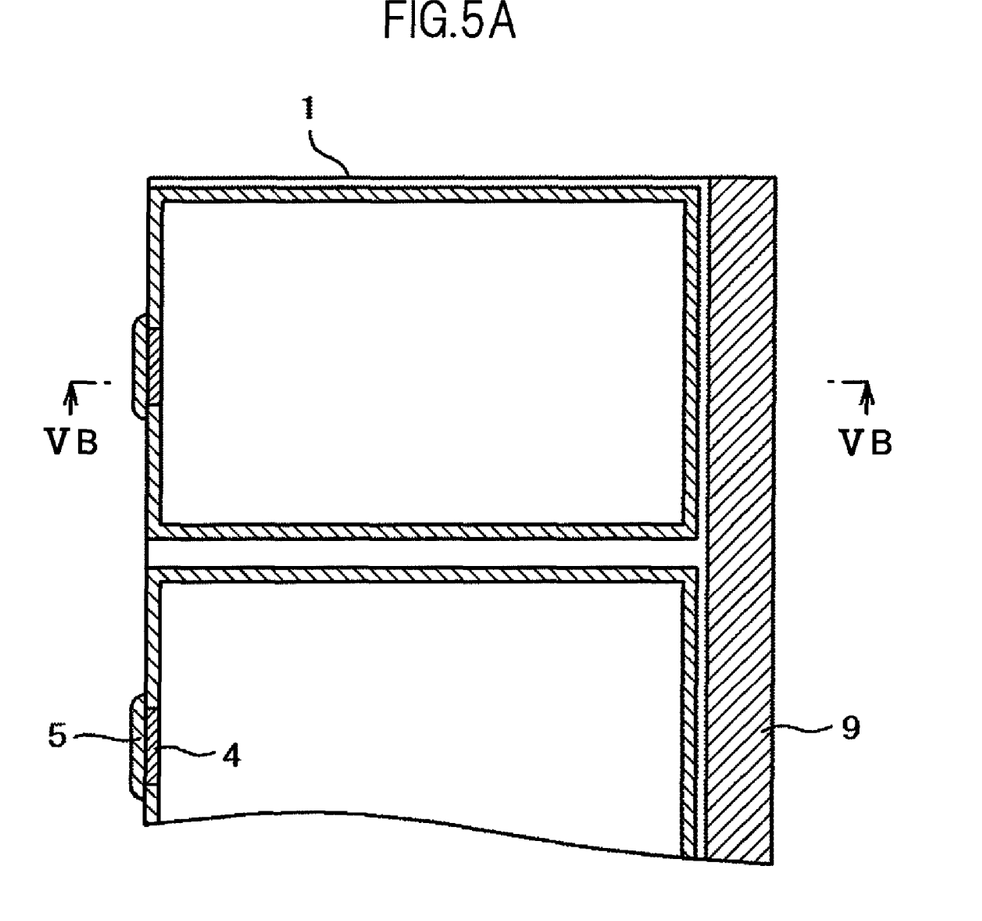
FIGS. 5A and 5B are explanatory structural views illustrating Embodiment 2 of the present invention.
Figure 5B:
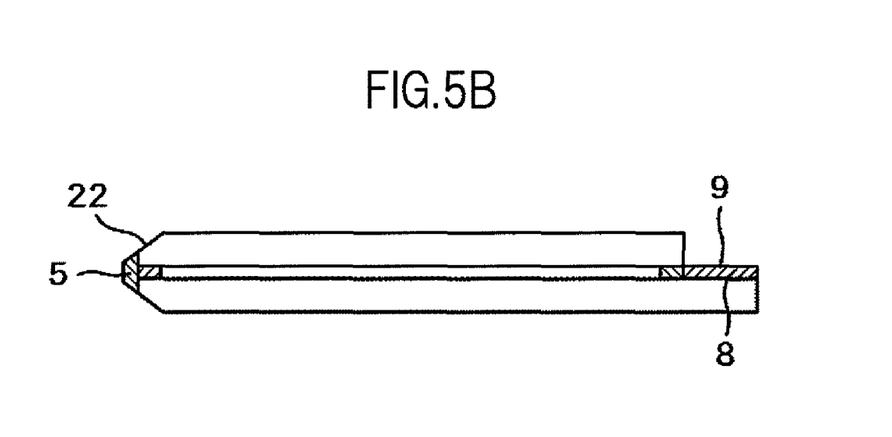

FIGS. 5A and 5B illustrate a pair of mother glass substrates according to a structure of Embodiment 2. FIG. 5A is a plan view and FIG. 5B is a cross sectional view taken along a line C-C of FIG. 5A after chemical polishing.

In Embodiment 2, the terminal portion 8 is exposed in advance. A protective film 9 is formed before chemical polishing to prevent the terminal portion 8 from being brought into contact with the etching solution. The other structures are the same as in Embodiment 1.

The protective film 9 is removed before the flexible circuit board is connected to the terminal portion. The protective film 9 may be removed before or after the pair of mother glass substrates 1 are cut into the respective liquid crystal panels. The protective film 9 may be an organic resist film or an organic film formed by CVD. The protective film 9 can be removed by chemical cleaning or mechanical peeling.

Even in this embodiment, the glass substrates can be etched so as to be uniform in thickness. Therefore, when the polarizing plates are bonded to the glass substrates, the breaking of glass or the remaining of bubbles does not occur. Thus, it is possible to manufacture a liquid crystal display device whose quality is high because of no degradation in image quality which is caused by the breaking of glass or the remaining of bubbles and whose display surface can be bent.

[Embodiment 3]

Figure 6A:
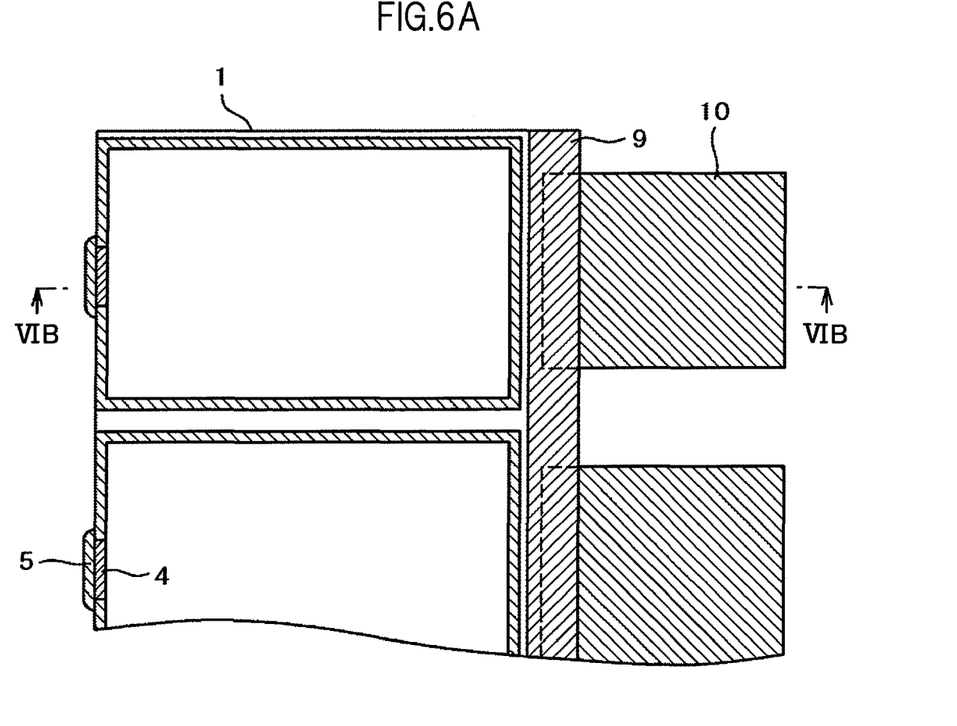
FIGS. 6A and 6B are explanatory structural views illustrating Embodiment 3 of the present invention.
Figure 6B:
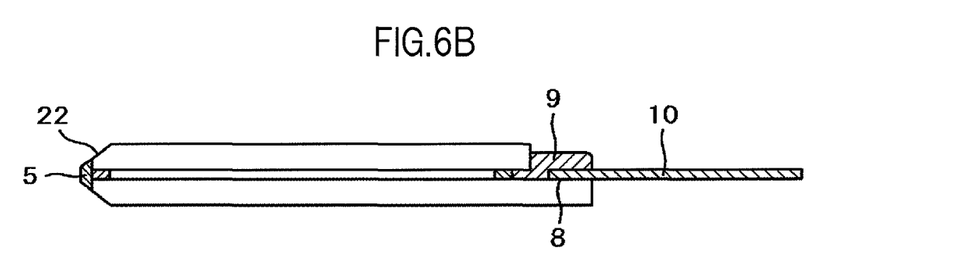

FIGS. 6A and 6B illustrate a pair of mother glass substrates according to a structure of Embodiment 3. FIG. 6A is a plan view and FIG. 6B is a cross sectional view taken along a line D-D of FIG. 6A after chemical polishing.

In this embodiment, the terminal portion 8 is exposed in advance, and then flexible circuit boards 10 are connected to the terminals on the terminal portion 8. The protective film 9 is formed to prevent the terminal portion 8 and the flexible circuit boards 10 from being brought into contact with the etching solution. The other structures are the same as in Embodiments 1 and 2.

After chemical polishing, respective liquid crystal panels each having a flexible circuit board are obtained by cutting. In this embodiment, it is unnecessary to remove the protective film 9, but the protective film 9 may be removed. The protective film 9 may be formed on the surface of the terminal portion 8 and only surfaces of the flexible circuit boards 10, which are close to the terminal portion, or may be formed on the surface of the terminal portion 8 and the entire surfaces of the flexible circuit boards 10. Not only the flexible circuit boards 10 but also other electronic parts may be attached to the terminal portion 8.

Even in this embodiment, the glass substrates can be etched so as to be uniform in thickness. Therefore, when the polarizing plates are bonded to the glass substrates, the breaking of glass or the remaining of bubbles does not occur. Thus, it is possible to manufacture a liquid crystal display device whose quality is high because of no degradation in image quality which is caused by the breaking of glass or the remaining of bubbles and whose display surface can be bent.

The invention made by the inventor of the present invention has been specifically described with the embodiments described above. However, the present invention is not limited to the embodiments, and thus various modifications can be made without departing from the scope of the present invention. In the drawings illustrating the embodiments, the sealing material 5 is substantially equal in width (size) to the injection hole 4. However, it is sufficient as long as the sealing material is larger in width than the injection hole. A maximum width of the sealing material may be a full width of a glass substrate end side in which the injection hole is provided.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A method of manufacturing a liquid crystal display device including a liquid crystal panel which has a first glass substrate, a second glass substrate, and a liquid crystal held in a predetermined gap with which the first glass substrate and the second glass substrate are bonded to each other by a seal material, comprising the steps of:

injecting the liquid crystal from an injection hole for injecting the liquid crystal, which is provided on at least one side of the liquid crystal panel;

sealing the injection hole with a sealing material that projects outwardly beyond the injection hole at least in a thickness direction of the first and second glass substrates;

beveling end sides of the first glass substrate and the second glass substrate, at which the injection hole is provided, together with the sealing material, to form a first beveled end side portion of the first glass substrate and a second beveled end side portion of the second glass substrate; and after completion of the beveling of the end sides of the first and second glass substrates, etching opposite surfaces of the first and second glass substrates forming the liquid crystal panel by chemical polishing to reduce a thickness of the liquid crystal panel delimited between the opposite surfaces of the first and second glass substrates in a thickness direction of the liquid crystal panel, and stopping the etching of the opposite surfaces before the thickness between the opposite surfaces is reduced to a thickness smaller than a thickness of the sealing material in the thickness direction of the liquid crystal panel.

2. A method of manufacturing a liquid crystal display device according to claim 1, wherein the thickness of the sealing material in the thickness direction of the liquid crystal panel is equal to or smaller than a thickness of the liquid crystal panel after the etching step.

3. A method of manufacturing a liquid crystal display device according to claim 1, wherein:

the liquid crystal panel comprises a terminal portion in which a terminal for receiving an external signal is provided outside the seal material and on a surface of the first glass substrate, which is opposed to the liquid crystal; and the etching step comprises forming another seal material outside the terminal portion for protecting the terminal portion.

4. A method of manufacturing a liquid crystal display device according to claim 1, wherein:

the liquid crystal panel comprises a terminal portion in which a terminal for receiving an external signal is provided outside the seal material and on a surface of the first glass substrate, which is opposed to the liquid crystal; and the etching step comprises forming a protective film having an etching resistance on the terminal portion.

5. A method of manufacturing a liquid crystal display device according to claim 1, wherein:
- the liquid crystal panel comprises a terminal portion in which a terminal for receiving an external signal is provided outside the seal material and on a surface of the first glass substrate, which is opposed to the liquid crystal;
- the terminal portion is connected to a flexible circuit board; and
- the etching step comprises forming a protective film having an etching resistance on surfaces of the terminal portion and the flexible circuit board.

6. A method of manufacturing a liquid crystal display device according to claim 1, wherein the first glass substrate and the second glass substrate after the etching step have thicknesses of 0.2 mm or smaller.

7. A method of manufacturing a liquid crystal display device according to claim 1, wherein the step of beveling end sides of the first glass substrate and the second glass substrate, at which the injection hole is provided, together with the sealing material, includes beveling the end sides of the first glass substrate and the second glass substrate and the sealing material at the same time so as to form the first beveled end side portion of the first glass substrate, the second beveled end side portion of the second glass substrate and third beveled end side portions of the sealing material.

8. A method of manufacturing a liquid crystal display device according to claim 7, wherein the first beveled end side portion of the first glass substrate has a surface which is substantially continuous with one side surface of the third beveled portions of the sealing material, and the second beveled end side of the second glass substrate has a surface which is substantially continuous with another side surface of the third beveled portions of the sealing material.

9. A method of manufacturing a liquid crystal display device according to claim 8, wherein the substantially continuous surface of the first beveled end side portion of the first glass substrate and the one side surface of the third beveled portions of the sealing material is a substantially smooth continuous surface, and the substantially continuous surface of the surface of the second beveled end side portion of the second glass substrate and the another side surface of the third beveled portions of the sealing material is a substantially smooth continuous surface.

10. A method of manufacturing a liquid crystal display device according to claim 1, wherein the sealing material projects outwardly beyond the injection hole and the end sides of the first and second glass substrates at which the injection hole is provided.

* * * * *